United States Patent
Meyl et al.

(10) Patent No.: US 9,402,503 B2
(45) Date of Patent: Aug. 2, 2016

(54) APPARATUS AND METHOD FOR PREPARING BEVERAGES BY ELECTROMAGNETIC RADIATION

(76) Inventors: Hendrik Meyl, München (DE); Frank Templin, München (DE); Bernd Spleiss, München (DE)

( * ) Notice: Subject to any disclaimer, the term of this patent is extended or adjusted under 35 U.S.C. 154(b) by 0 days.

(21) Appl. No.: 13/381,695

(22) PCT Filed: Jul. 1, 2010

(86) PCT No.: PCT/EP2010/003979
§ 371 (c)(1),
(2), (4) Date: Feb. 11, 2012

(87) PCT Pub. No.: WO2011/003543
PCT Pub. Date: Jan. 13, 2011

(65) Prior Publication Data
US 2013/0022717 A1    Jan. 24, 2013

(30) Foreign Application Priority Data

Jul. 6, 2009 (DE) .......................... 10 2009 031 758
Jun. 29, 2010 (DE) .......................... 10 2010 025 397
Jun. 29, 2010 (DE) .......................... 10 2010 025 399

(51) Int. Cl.
*A47J 31/02* (2006.01)
*A47J 31/44* (2006.01)
*A47J 31/54* (2006.01)

(52) U.S. Cl.
CPC ..................................... *A47J 31/547* (2013.01)

(58) Field of Classification Search
CPC .............. A23F 5/26; A23F 5/28; A47J 31/00; A47J 31/02; A47J 31/06; A47J 31/043; A47J 31/10; A47J 31/24; A47J 31/30; A47J 31/32; A47J 31/34
USPC ............ 99/279, 289 R, 295, 302 R, 303, 304, 99/306, 307, 323; 219/687–689; 426/241, 426/431, 432, 433
See application file for complete search history.

(56) References Cited

U.S. PATENT DOCUMENTS 2,086,357 A * 7/1937 Farber ............................. 99/292
2,381,104 A * 8/1945 Burnham ................... 210/497.1
(Continued)

FOREIGN PATENT DOCUMENTS

CA     2054881      5/1993
DE     3742507      12/1987
(Continued)

OTHER PUBLICATIONS

O-ring—Wikipedia (Feb. 28, 2010, via web.archive.org).*
(Continued)

*Primary Examiner* — David Angwin
*Assistant Examiner* — John J Norton
(74) *Attorney, Agent, or Firm* — 24IP Law Group; Timothy R DeWitt

(57) ABSTRACT

The invention is an improvement of the filter unit in beverage makers. Said filter unit comprises a filter insert and a filter lock, can be placed as a whole onto and removed from the brewing container, and at the same time ensures good sealing of all components. For improved handling, the brewing chamber can be filled and closed outside of the beverage-maker, wherein the particularly large depth of the filter insert offers significant assistance. Closing the brewing chamber by means of the filter closure prevents the beverage base material from oozing out due to a ring engaging in the filter insert and additionally ensures its adequate sealing. By widening the brewing chamber, the beverage-making machine provides a consistent quality of the beverages with of different fill levels.

9 Claims, 11 Drawing Sheets

(56) References Cited

U.S. PATENT DOCUMENTS

| | | | |
|---|---|---|---|
| 2,528,253 A * | 10/1950 | Sullivan | 99/292 |
| 2,544,324 A * | 3/1951 | Jepson | 99/292 |
| 2,551,563 A * | 5/1951 | Jepson | 277/641 |
| 2,577,990 A * | 12/1951 | Ziskin et al. | 210/481 |
| 2,601,067 A | 6/1952 | Spencer | |
| 4,104,957 A * | 8/1978 | Freedman et al. | 99/283 |
| 4,386,109 A * | 5/1983 | Bowen et al. | 426/241 |
| 4,999,466 A | 3/1991 | Waligorski | |
| 5,281,785 A | 1/1994 | Pasbrig | |
| 5,445,022 A | 8/1995 | Vassallo | |
| 5,884,551 A | 3/1999 | Orrico et al. | |
| 6,026,733 A * | 2/2000 | Orrico et al. | 99/302 R |
| 2004/0020922 A1* | 2/2004 | Alves | 219/679 |
| 2005/0211102 A1 | 9/2005 | Vu et al. | |

FOREIGN PATENT DOCUMENTS

| | | |
|---|---|---|
| EP | 1060701 | 12/2000 |
| EP | 1552776 | 9/2006 |
| WO | 9112757 | 9/1991 |
| WO | 9925156 | 5/1999 |
| WO | 2004027301 | 4/2004 |

OTHER PUBLICATIONS

DIN EN 13248:2002 (German version) / DIN EN 13248:2003-10 (English version), Cookware—Coffee makers for domestic use with an independent heat source—Definitions, requirements and test methods.

* cited by examiner

APPARATUS AND METHOD FOR PREPARING BEVERAGES BY ELECTROMAGNETIC RADIATION

The present application claims priority of German patent application DE 10 2009 031 758 filed in 6 Jul. 2009, German patent application DE 10 2010 025 397, filed on 29 Jun. 2010 and German patent application DE 10 2010 025 399, filed in 29 Jun. 2010.

FIELD OF THE INVENTION

The invention relates to beverage makers for the preparation of single servings of a beverage with use of electromagnetic radiation. Single beverage servings are an amount that is prepared for exactly one person for immediate consumption. The wavelength of the usually applied electromagnetic radiation is in the range of centimeters (micro waves).

INTRODUCTION AND RELATED ART

There is a plurality of popular beverages, which often require the extraction of an aroma carrier in their preparation. Corresponding brewing methods are known for a long time. They can, however, only be realised with high time and/or capital commitments or serve a beverage of lower or even of bad quality.

Due to the high requirements required by the preparation of an espresso, the invention is described in a subsequent description referring to this. The person skilled in the art will easily transfer the invention to other beverage makers, such as for example a coffee or a tea maker.

A typical espresso has a volume between 22.5 ml and 27.5 ml and is prepared by an extraction of 6.5 g to 7.5 g of evenly and fine grinded beverage base substance of strongly roasted coffee beans (espresso roasting) for 22.5 to 27.5 seconds with about 86° C. to 90° C. hot brewing liquid under 800 kPa to 1 MPa pressure. The beverage temperature in the reception container is ideally between 64° C. and 70° C.

The brewing chamber is the cavity of the beverage maker in which the beverage base substance is located that is to be extracted or dissolved.

European norm EN 13248 described the usual home-use coffee maker for use on a stove. The brewing chamber is thereby defined by the filter funnel and the filter. The brewing chamber can optionally be reduced by the user by use of a reduction filter. The typical sealing device is a rubber sealing in form of a ring which in normal use also clamps the filter to the reception container (also termed extraction or infusion container), but which can be removed for cleaning. Disadvantages of this apparatus are the considerably laborious sound cleaning or the appearance of deposit with simple cleaning. In addition, the brewing chamber is to be filled with the beverage based substance only when opened. There is no aid in condensing the beverage base substance as well as there is no aid in a clean filling of the beverage maker.

The U.S. Pat. No. 4,386,109 (Bowen et al.) describes a beverage maker for a microwave oven. A pressure chamber forms herein the brewing container which is closed with the filter chamber which provides a constraining way to the reception container. Thereby a predetermined brewing pressure can build up in the brewing container. The brewing container is, in this sequence, filled with brewing liquid, closed with a filter insert, in the latter the brewing base substance is filled, and finally it is closed with pressure tightly with the filter lock.

Bowen et al. also describe the desired compression of the beverage base substance by which the brewing liquid is evenly guided through the layer of beverage base substance. This compression also is a relevant pre-assumption for obtaining the desired brewing pressure. The invention described here is, however, difficult to handle by the user, for example, the beverage base substance can be spilled when filling. This is in particular the case in preparation of single espressos in the Italian way easily as hereby the entire maker is very small. Additionally, the filling of the maker has to be done in a strict sequence and a correction without wasting substances is almost impossible.

The Canadian patent CA 2054881 (Siccardi) describes a coffee maker for the use under microwave radiation. Herein the brewing chamber is formed by a removable jar with perforated bottom and which is closed by a perforated cover. A separated O-ring is inserted between jar and cover to ensure sealing. This invention does not comprise means for compression of the beverage base substance as well as it does not comprise any means against the spilling of the beverage base substance. The multiple sealing surfaces together with a large surface that is to be sealed make the safe use of higher pressures more difficult.

The European patent application EP 1060701 (Converti) describes a beverage maker in which the brewing liquid is located in a container around the brewing chamber and the brewing chamber can take up almost or completely the entire brewing liquid. In this way of making beverages, there is the danger that the beverage base substance is not extracted or dissolved optimally. This is particularly the case for single servings. This is neither possible with this apparatus to nearly achieve brewing pressures corresponding to pressures required for espresso, in particular because a compression of the beverage base substance is entirely excluded.

The U.S. Pat. No. 5,281,785 (Pasbrig) describes a microwave beverage maker which works similarly to the household coffee makers for use on a stove. The brewing chamber is formed in a brewing container by a funnel type filter insert and a filter lock. A common paper filter filled with beverage base substance is inserted in the filter insert. The filter lock is formed such that it can be easily placed on the funnel type insert. It is, however, not designed for a sufficient compression of the beverage base substance. In case the brewing chamber is filled such that the locking of the brewing chamber leads to a compression of the beverage base substance, the over-spilling of the beverage base substance out of a gap between the funnel type insert and the filter lock is inevitable.

The U.S. Pat. No. 5,884,551 (Orricco et al.) describes a microwave beverage maker in which the brewing container, brewing chamber and receptor container are integrated into one apparatus. The beverage maker is filled upside down with the brewing liquid and a cartridge containing the beverage base substance, is locked with the bottom of the maker, and flipped back and the beverage is brewed in the microwave oven. The cartridge consists of a bowl-shaped body with a first filter and a pivoting lock attached thereto. For filling the cartridge, the lock is opened, it is filled with beverage base substance and the cartridge is closed again. Due to the use of the cartridge, the filling of the beverage maker is clean. A compression of the beverage base substance is, however, not possible and due to the use of a rubber valve only an excess pressure of 34.47 kPA can be achieved. It is to be noted that the lock cover of the brewing container is not sealed, i.e. it comprises a particularly large surface to be sealed.

U.S. Pat. No. 4,999,366 (Waligorski) shows a micro wave coffee maker in which a brewing chamber is arranged below a toroid brewing container. It does, however, not pressure tightly close the beverage maker. Even with the use of sealing devices, this type of connection of the brewing chamber with the brewing container avoids achieving the pressure required for espresso. In addition, the lock of the filter container is not provided for compressing the beverage base substance in this case as its shape is only useful as a slightly depressed handling air the user.

A relevant aspect in the use of electromagnetic radiation for heating is the shielding of parts that are not to be heated. For example, the beverage base substance must not be burned at the completed beverage should not be further heated and should not boil. Existing methods are the use of solid metal (U.S. Pat. No. 2,601,067, U.S. Pat. No. 4,386,109) or a conducting coating (U.S. Pat. No. 2,601,067) in order to shield the corresponding areas from electromagnetic radiation. The property of electromagnetic radiation that it is not propagating through openings below a specific size is also known.

All known embodiments of beverage makers closing the brewing container with the filter chamber pressure tightly have in common that the brewing chamber is only filled in the maker. This has the particular disadvantage that in spilling the beverage base substance, the beverage maker is contaminated which can lead to a contamination of the beverage.

In order to enable the build-up of an adequate pressure in the brewing chamber, the beverage base substance is compressed (tampered) prior to the brewing process. The stronger the tampering is, the higher is the required brewing pressure i.e. the longer is the brewing time. Thus, the brewing result can considerably deviate from the desired value if tampering is too strong or too weak.

In tampering by closing the brewing chamber, the compression is directly related to the amount of beverage base substance. In case, there is too much beverage base substance in the brewing chamber, tampering is too strong and if not enough beverage base substance is present, tampering is not sufficient.

Apportioning of the beverage base substance is a further important premise for the quality of the beverage. In brewing coffee, for example, an over-apportioning leads to a bitter beverage and apportioning too less leads to a flavourless beverage, both of which should be avoided.

Apportioning is particularly critical in brewing methods in which the amount of beverage base substance is not only influence the amount of aroma substances provided but also influences directly the brewing process. This influence can relate, for example to the brewing time, the brewing temperature and the brewing pressure. Consequently, a filling as exactly as possible is desired for such brewing methods.

An apportioning device is an important tool for the filling method. Apportioning devices according to the state of the art have a handle at the same height as the opening of the spoon cavity. Thereby, the measured amount falls out in a non-controlled manner when emptying the apportioning device. There is the danger that beverage base substance is spilled of the border of the filter insert by which the surrounding of the sealing is contaminated.

Besides beverage base substance in bulk, a pad or a cartridge are sometimes used in beverage making. A pad (also called pod) is a pre-portioned amount of beverage base substance for the preparation of a pre-defined amount of beverage which is distributed in a flexible packaging. Filter paper is often used for packaging. In case a rigid packaging such as for example plastics or aluminium is used, this is usually called a cartridge.

The design, that is the aesthetic appearance of the beverage maker, is also determined mainly by the technique features in all known brewing makers. A wide separation of the design and technical features of the beverage maker was not possible until now.

An object of the invention is a good sealing of the brewing container such that the beverage maker can cone to the required brewing pressures for the preparation of espresso.

A further object of the invention is to minimize the number of components to be handled and the number components to be unmounted for cleaning (for example rubber sealings).

It is in particular an object of the invention that the beverage maker can be filled easily and cleanly as well as that the beverage maker is not unnecessarily contaminated during filling.

A further object of the invention is to ensure a simple, clean and secure handling of the beverage maker.

An additional object of the invention is to keep all surfaces reachable as far as possible for a faster and better cleaning.

It is equally an object of the invention to allow a free design of the outer appearance due to the construction of the beverage maker.

Additionally, an object of the invention is that an equal brewing quality is achieved even with different filling.

Finally, it is an object of the invention that the beverage maker can be manufactured cost efficient, simple and non-error-prone.

The invention has an application in beverage makers which can be used for preparing beverages with electromagnetic radiation.

The invention may be used in particular with small portable systems which exclusively prepare single beverage servings.

The invention may also be used for the preparation of a plurality of servings or for the preparation of other nutrition in which the preparation is based on a brewing process with hot liquid with or without pressure.

SUMMARY OF THE INVENTION

The invention is an improvement of the filter unit of beverage makers. It comprises a filter insert and a filter lock, can be set on and removed from a brewing container in an entity, and provides in the same time a good sealing for all components. The brewing chamber can be filled and closed outside the beverage maker for a better handling, wherein particularly a large deepness of the filter insert provides a significant aid. The locking of the brewing chamber by the filter lock avoids the spilling of beverage base substances by a ring engaging in the filter insert and ensures additionally its adequate compression. By widening the brewing chamber, the beverage maker provides always the same beverage quality, even with different filling.

The method for filling the brewing chamber of a beverage maker with the beverage base substance can be modified due to the new filter unit. When filling the maker, the beverage base substance is enclosed during movements and is positioned when changing the surrounding parts such that it cannot be spilled. The method comprises thus the following steps:

(a) Filling of the apportioning device;
(b) Imposing the filter insert on the filled apportioning device;
(c) Flipping over the filter insert and the apportioning device together;
(d) Depositing the filter insert on a flat depot;
(e) Removing the apportioning device;
(f) Imposing the filter lock on the filled filter insert;
(g) Pressing the filter lock, such that a combined filter unit is formed;

(h) Placing the filter unit on top of the filled brewing container;
(i) Tightening, such the brewing unit is ready for use;
(j) Flipping over the brewing unit;
(k) Placing the brewing unit on the reception container.

This method is performed with help of the apportioning device according to the invention.

BRIEF DESCRIPTION OF THE DRAWINGS

FIG. 1 shows a first example of the invention;
FIG. 2 shows an exploded view of the first example in FIG. 1;
FIG. 3 shows the filter insert of the first example in FIG. 1 (cut B-B in FIG. 4);
FIG. 4 shows a side view of the filter insert in the first example in FIG. 1 (viewing direction A-A in FIG. 3);
FIG. 5 shows the filter lock in the first example in FIG. 1 (cut D-D in FIG. 6);
FIG. 6 shows the top view of the filter lock of the first example in FIG. 1 (viewing direction C-C in FIG. 5);
FIG. 7 shows a second example of the form of the brewing chamber;
FIG. 8 shows a third example of the form of the brewing chamber;
FIG. 9 shows a second example of the invention;
FIG. 10 shows the detail cut out E of the second example of the invention;
FIG. 11 shows a filter lock according to the invention;
FIG. 12 shows the filter lock according to the invention with overfilled brewing chamber;
FIG. 13 shows a filter insert according to the invention;
FIG. 14 shows the cross-section of the apportioning device according to the invention;
FIG. 15 shows a side view of the apportioning device;
FIG. 16 shows step (a) of the method according to the invention;
FIG. 17 shows step (b) of the method according to the invention;
FIG. 18 shows step (d) of the method according to the invention;
FIG. 19 shows step (e) of the method according to the invention;
FIG. 20 shows step (f) of the method according to the invention;
FIG. 21 shows step (g) of the method according to the invention;
FIG. 22 shows step (h) of the method according to the invention;
FIG. 23 shows step (i) of the method according to the invention;
FIG. 24 shows step (k) of the method according to the invention;
FIG. 25 shows step (l) of a variation of the method according to the invention;
FIG. 26 shows step (m) of a variation of the method according to the invention.

DETAILED DESCRIPTION

Figure 1:
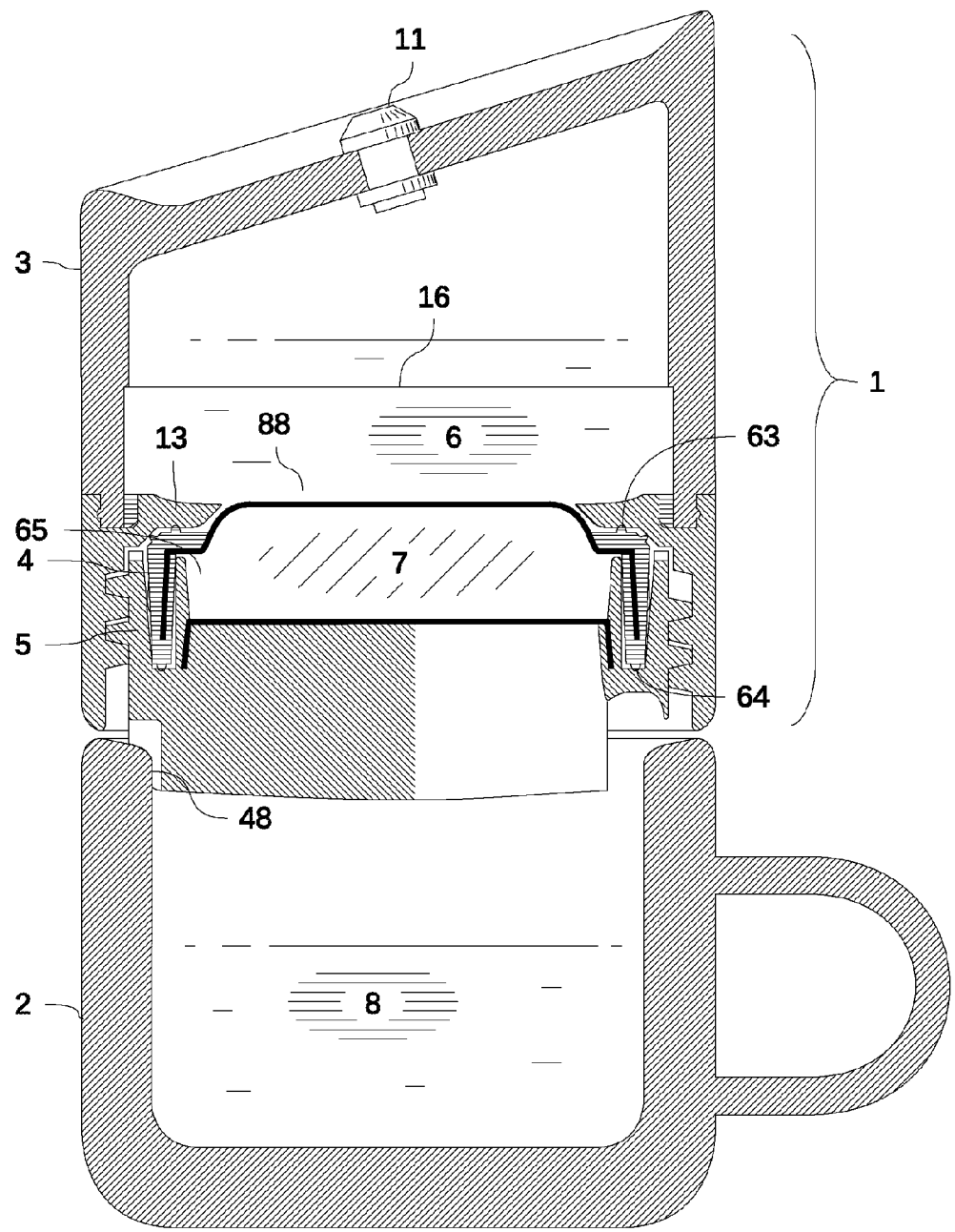
FIGS. 1 to 26 show different examples and details of the invention.

The first example of the invention as shown in FIG. 1 comprises a brewing unit (1) and a reception container (2). The brewing unit (1) is composed of a brewing container (3) and a filter unit (88). The filter unit (88) comprises in turn a filter insert (4) and a filter lock (5).

The filter unit (88) encloses and defines the brewing chamber (65) which is filled with the beverage base substance (7). The brewing liquid (6) is located in the brewing container (3) and the finalised beverage (8) is collected in the reception container (2).

The connection of all parts of the brewing unit (1) is made by the filter lock (5) which is engaged in a releasable connection with the brewing container (3) and by which the filter unit (4) is pressed against the angular-shaped flange (13) of the brewing container (3).

The filter lock (5) also is in a releasable connection with the reception container (2) and ensures a connection between brewing unit (1) and reception container (2). This is preferably a plug-in connection and ensures that the beverage maker is held together when putting it in and out of the microwave oven and in transport. The connection (48) further ensures that vapour that ascents from the finalised beverage (8) can volatilise and cannot build up a pressure within the reception container (2).

The brewing container (3) forms together with the filter unit (88) a pressure container in which the required pressure for the brewing process can build up. The sealing area (63) between the filter insert (4) and the brewing container (3) and the sealing area (64) between the filter insert (4) and the filter lock (5) ensure the pressure tight connection. The brewing container (3) is provided with a safety mechanism (11) for safety reasons which maintains the pressure in the brewing container below a safety pressure.

Figure 2:
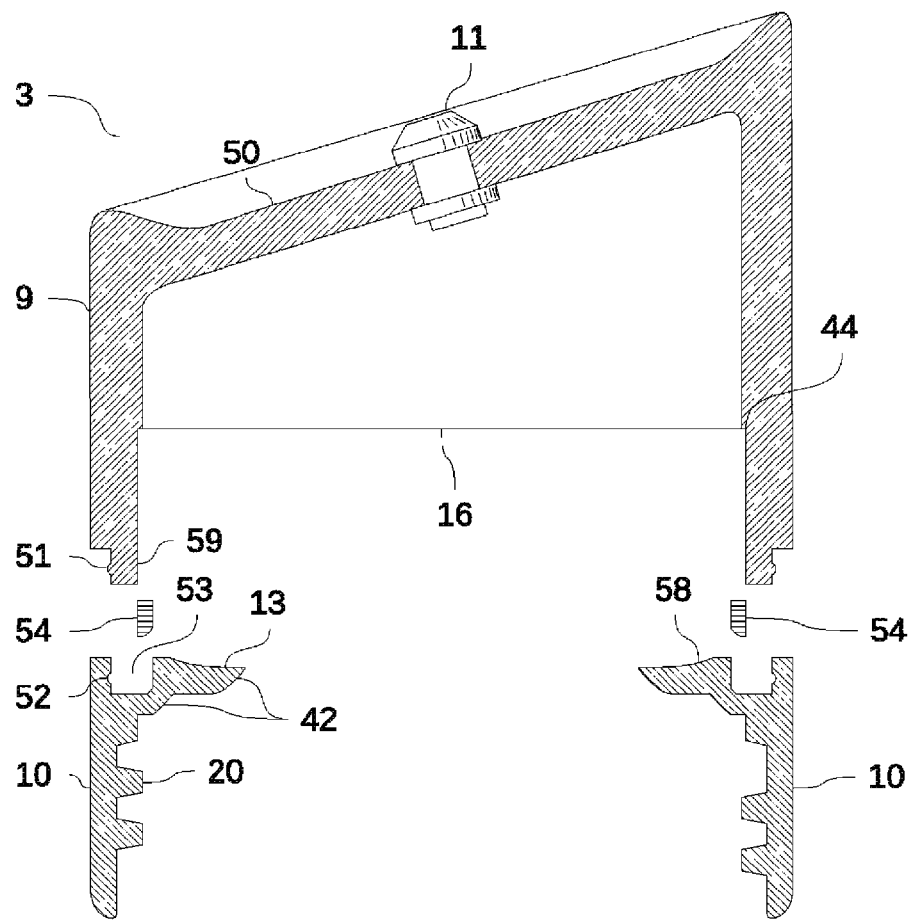

As shown in FIG. 2, the brewing container (3) comprises a liquid container (9), a filter reception (10) and the safety mechanism (11). The brewing container is easily accessible via an opening and is thus easy to clean and to fill. A gauge mark (16) is arranged in the liquid container up to which the brewing liquid (6) is filled in normal use. The bottom (50) of the brewing container is either plane or, as shown inclined. The brewing container can have indeed different forms without leaving the scope of the invention.

The liquid container (9) is entirely made of transparent material. Thereby the water level (6) as well as the gauge line (16) is visible from the inside and the outside when filling the liquid container (3). The gauge line (16) is formed by a small projection (44) in the liquid container (9) and is thus unremovable. It can also be attached in a different manner, for example by printing, by a groove or a ring.

The filter reception (10) comprises the support flange (13) which ensures on the side facing towards the liquid container by form (58) that the entire brewing liquid (6) finds the way to the filter unit (88). The filter reception (10) can also comprise tapers (42) by which the filter insert (4) is centred during insertion. Finally, it also contains the locking-mechanism (20) of the brewing container (3) to the filter unit (88).

The filter reception (10) is permanently attached to the liquid container (9). This connection can be made in different ways, for example by adhering, soldering, plugging or clamping. The connection used herein consists of a flange (59) at the liquid container (9) which fits in groove (53) in filter reception (10) and which is clamped by a tapered ring (54). For better support, the connection can be additionally provided with noses or with a ring (51) at flange (59) which clicks in or latches in the latch (52) of groove (53).

Figure 3:
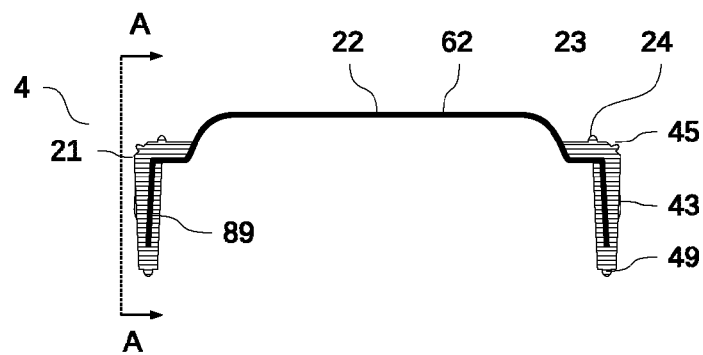
Figure 4:
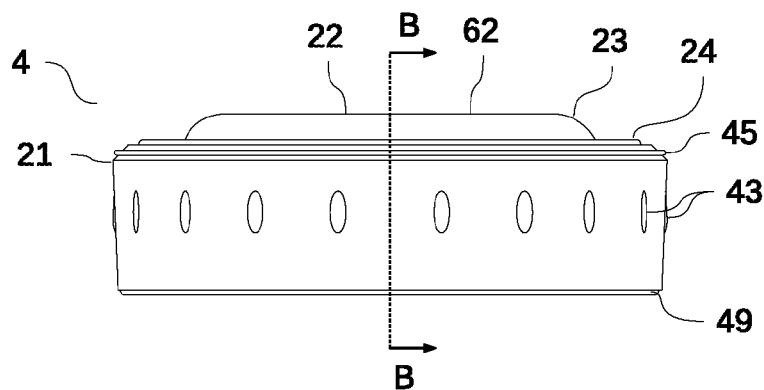

The filter insert (4) shown in more detail in FIGS. 3 and 4 consists of a support ring (21) in which a first filtration device (22) is inserted. The filtration device (22) consists of a sheet metal (89) perforated with sieve holes (62). The sheet metal (89) is formed in a bowl-shape form and is continued in the supporting ring (21). The curvature (23) is formed such that the filter (22) fits to a commercially available pad (12).

The filter insert (4) comprises all sealing elements of the beverage maker (1). Sealing area (63) is implemented by sealing (24) and the sealing area (64) by sealing (49) (see also FIG. 1). These sealings can be made from separate O-rings or of O-rings moulded onto the filer insert. If the supporting ring (21) is entirely made of an elastic material, they are part of the supporting ring (21). Due to the consequent few undercuts and gaps, the cleaning of the maker is simple and the maker can be kept in a hygienically impeccable state. Additionally, the mounting of several parts and the necessity of complex manufacturing methods is avoided. The beverage maker is simple and cost efficient producible.

The filter insert (4) is reversibly connected to the filter lock (5) by burls (43) arranged at the outside of the filter insert (4) which press against the inner side of the filter lock. The handling edge (45) makes the release of filter unit (4) and filter lock (5) easier.

In order to limit the spilling of beverage base substance (7) during filling of the filter insert (4) as much as possible, is deeper than the closed brewing chamber (65).

Figure 5:
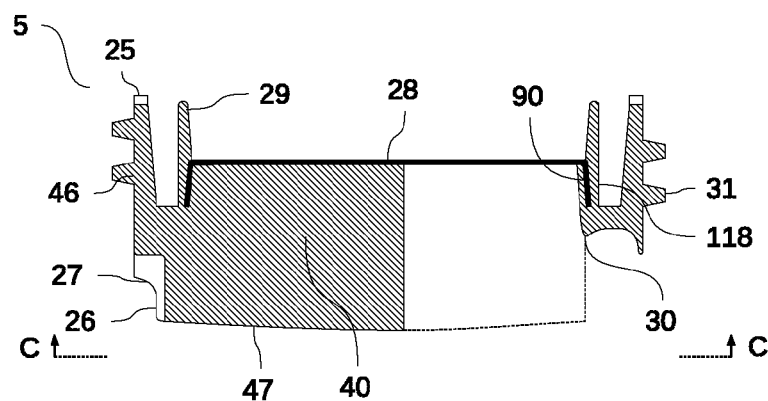
Figure 6:
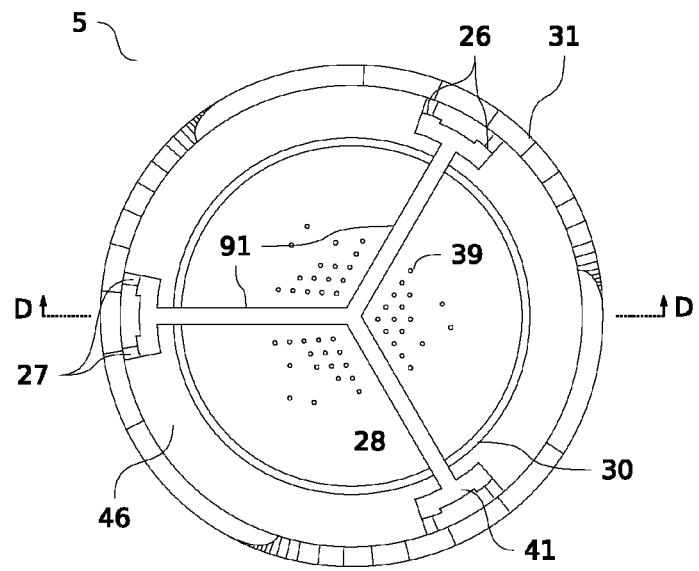

FIGS. 5 and 6 show the filter lock (5). This comprises a supporting ring (46) which comprises a cylindrical extension (118) which engages in the filter insert (4). This cylindrical extension (118) is closed with a second filtration device (28). The filtration device (28) consists of a sheet metal (90) perforated with sieve holes (39). The sheet metal (90) is formed in a bowl-shaped from and is extended into a supporting ring (46). As in the sheet metal (89) in filter insert (4), sheet metal (90) can be formed with a curvature whic fits to a commercially available pad (12).

The supporting ring (46) is provided with a locking mechanism (31), preferably with a threefold start thread which is connected with the locking mechanism (20) of the filter reception (10) of the filter container (3). The locking way of the thread is 45° to 180° degrees for easy handling, preferably 150°. Other ways of connecting are equally possible, for example a bayonet fixing or other types of threads. This connection also ensures the compression of the beverage base substance (7). Additionally, an opening of the brewing unit (1) by an unintentional activation of the locking system is not possible.

In order to avoid spilling out of the gap between the filter insert (4) and the filter lock (5) of beverage base substance (7) due to compression when closing the filter chamber (65) i.e. when assembling the filter insert (4) and the filter lock (5), the filter lock (5) is provided with the ring (29) protruding into the brewing chamber. It locks the brewing chamber (65) prior to starting compression.

The filter lock (5) comprises the handle (40) by which the filter unit (88) can be handled and closed. In this example, the handle (40) is formed by three stokes (91) formed in the form of lamella inside the supporting ring (46). Other locking mechanism of the filter lock (5) may require a different implementation of the handle (40).

For loosening and removing the beverage base substance (7) which can come unwanted into the lock gap between the filter insert (4) and the filter reception (10), a saw tooth pattern (25) is formed the side of the filter lock (5) facing towards the filter reception (10).

The releasable but not self releasing connection (48) between the brewing unit (1) and the reception container (2) is implemented by plugging lips (26) of the filter lock (5) (see also FIG. 1). These are formed at each end of the crossbeam (41) which form the ends of three stokes (91) of the handle (40) formed as lamella. Herein the spacers (27) ensure sufficient distance to the reception container (2), such that it is ensured that no pressure is built up in the reception container (2). A drip stone (30) may be provided in order to let the beverage (8) dropping cleanly into the reception container (2) after leaving the brewing chamber (65).

For preparation of the brewing process, the apparatus is separated into its components, brewing container (3), filter insert (4), filter lock (5), and reception container (2). The brewing container (3) is filled with the brewing liquid (6) up to the gauge mark and is provided. The filter insert (4) is filled with the desired brewing base substance (7). For filling the filter insert (4), a so called pad (12) or a cartridge may also be used. Then, the filter lock (5) is connected with the filter insert (4), such that both are maintained together and build the filter unit (88) with which the brewing container (3) is closed pressure tightly. The brewing unit (1) prepared in this way, is flipped around and plugged, with the filter side upside down, in the reception container (2).

The beverage maker prepared in that way, is exposed to suitable electromagnetic radiation in order to heat the brewing liquid (6), for example by way of a commercially available micro wave oven. During the brewing process this status can be monitored with a liquid level display in the brewing container (3). Due to the generated pressure in the brewing container (3) the brewing liquid is pressed through the beverage base substance (7) and beverage (8) is brewed. The overpressure generated during the brewing process in the brewing container (3) is in the range between 0 Pa and 2 MPa. It is to be noted here, that for reaching a steady brewing pressure, i.e. the pressure at which a significant flow of brewing liquid through the beverage base substance occurs, and for brewing pressures above 300 kPa, a pressure and flow regulating device is required.

After finalising the brewing process, the beverage maker is taken out of the micro wave, the brewing unit (1) is detached from the reception container (2) and put aside. The beverage is consumed directly from the reception container (2).

An important factor for the passage time, pressure and temperature is the compression of the beverage base substance (7). This function is implemented by the closing of the filter chamber (65). The filter insert (4) is deeper than the actual height of the pad (12) or of the compressed beverage base substance (7). This makes the filling with bulk beverage base substance (7) in sufficient amount possible and the spilling of the beverage base substance (7) is avoided, in particular, when placing the filter lock (5).

Particularly important is the possibility for monitoring the brewing process by the user of the beverage maker. Due to the transparent liquid container (9), the operational status of the beverage maker can be determined at any time because all commercially available microwave ovens have a large window. The handling safety is tremendously increased thereby, because the micro wave oven is to be switched off with the complete passage of the brewing liquid (6). Another possibility for monitoring the brewing process can be windows in the brewing container (3) in case this is generally made from an opaque material. Viewing windows in the reception container (2) or in entirely transparent reception container (2) are also possible. A further possibility is the use of a flow that is visible from the outside.

Operating errors of the maker are clearly recognisable and are thus apparent to a user. Examples hereto are the inclined upper side (50) of the brewing unit (1), which implies that this is not the pre-determined stable surface on to which the maker is to be placed, as well as the curvature (47) of the handle (40) of the filter lock (4) which has the effect that the brewing unit (1) does not stand stable if it is not mounted to the reception container (2).

The design of the filter lock is chosen such that in case of insufficient function of the sealing connection (24), for example with insufficient closing of the filter lock (5), no brewing liquid (6) comes to the outside of the beverage maker but runs into the reception container (2) in a controlled way. In this way, the micro wave oven and the beverage maker are not contaminated and remain clean.

The way of construction of the filter unit (88) ensures that no discharge (light arcs) can occur, either in between the metal parts (89, 90) or between the metal parts of (89, 90) and parts of the micro wave oven. The metal parts (89, 90) are also designed such that reasonless heating be avoided.

The selection of the material of the filtration devices (22, 28) was made based on the requirement of shielding the beverage base substance (7) from electromagnetic radiation but it may be unnecessary in other embodiments of the invention such that other filtration devices (22, 28) can be used as well without departing from the spirit of the invention. For example, the shielding can be formed larger: If the reception container (2) also provides a shielding for electromagnetic radiation, sheet metal (89) and the reception container (2) can shield the beverage base substance (7) and also the finalized beverage (8). Hereby it is also possible that no shielding function is required in the filter lock (5) and only the filter insert (4) comprises components made for metal or from another shielding material.

The materials which come into contact with the brewing liquid (6), the beverage base substance (7) and the extraction of infusion (8) are selected such that they are food save and do not alter the organoleptic properties of the beverage (8). The entire beverage maker is designed for dishwashers and all materials are suitable for dishwashers. The beverage maker is portable and robust such that it can be taken along to everyday work or for travelling.

Figure 7:
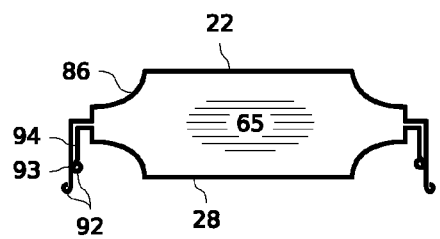
Figure 8:
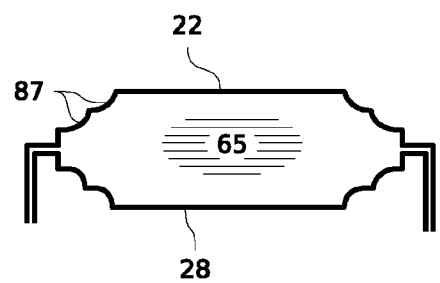

FIGS. 7 and 8 show variations to the brewing chamber (65). In order to improve the reception of a pad (12), the taper of the brewing chamber (65) in direction of towards its edge is provided such that the brewing liquid (6) flows mainly through the centre of the pad (12). The taper follows a predetermined profile (86, 87) which does not correspond to the normal shape of a commercially available pad. It is also to be noted that the pad (12) is clamped between the filtration devices (22, 28) such that the brewing liquid (6) is forced to flow through the centre of the pad (12) instead of around it. The profile (87) ensures additionally that the paper of the pad (12) has less or no folds and is tightened due to the larger surface of the filter chamber (65).

FIG. 7 shows additionally a possibility to improve the shielding and to form in the same time the connection between the filter insert (4) and the filter lock (5). This is achieved by forming at least one of both parts (89, 90) of the filter unit (88) with spring loaded plugging elements (94) made from metal and thus both parts (89, 90) form together a sliding contact (93) which ensures the electric as well as the mechanic contact between filter insert (4) and filter lock (5). The metal parts also provide curvatures (92) at their edges which can be formed for example by diverting the metal sheets. The curvatures (92) reduce the electrical fields and avoid the formation of coronal losses and light arcs.

Figure 9:
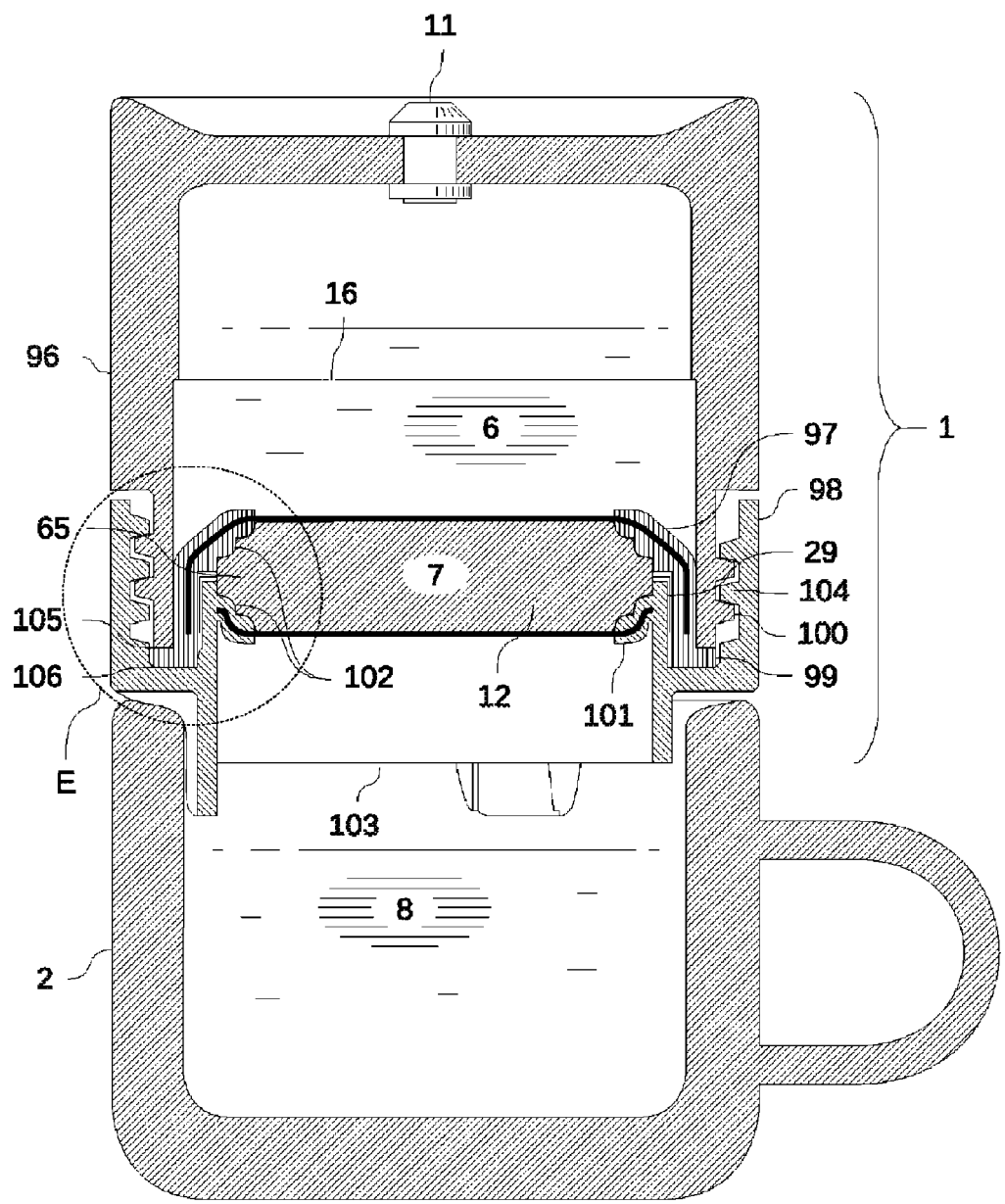
Figure 10:
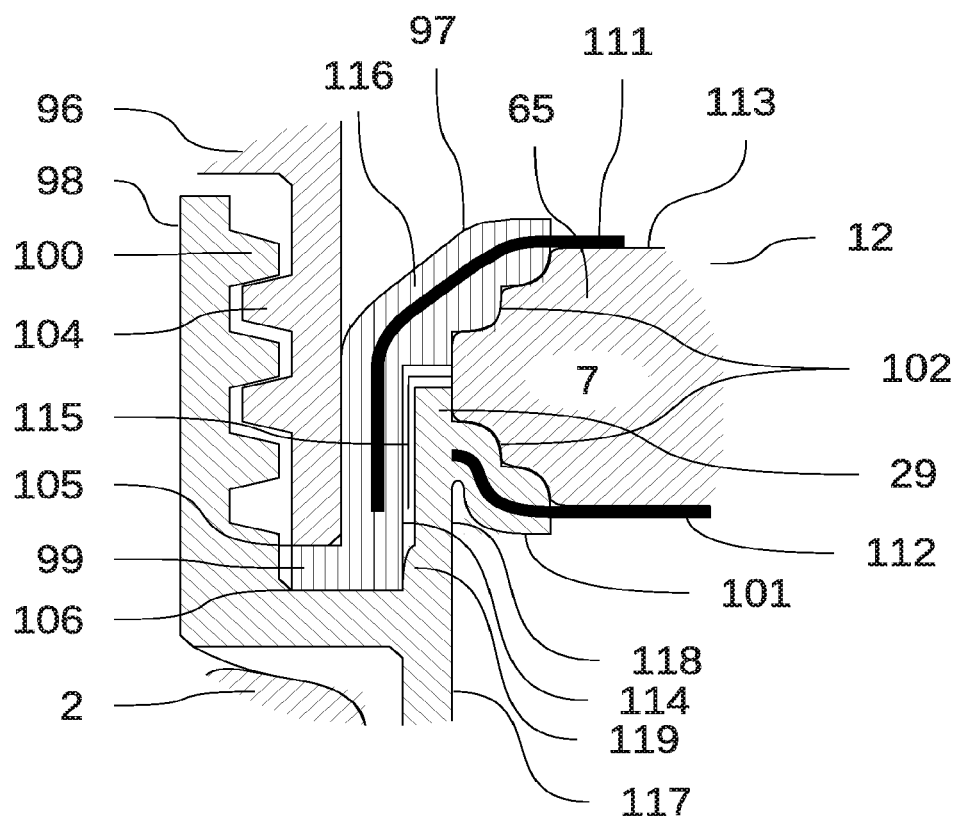

A second example of the invention is shown in FIGS. 9 and 10, with a brewing unit (1), comprising brewing container (96) and filter unit (103) and a reception container (2). The brewing container (96) consists of a substantially cylindrical body which is closed on one end and which is open on the other end. The opening is closed by the filter unit (103) consisting of filter inserts (97) and filter lock (98). The connection between brewing container (96) and filter unit (103) is made by the locking mechanism (100) of the brewing container (96) and of the filter lock (98). Both locking mechanism (100, 104) cooperate together and are preferably threads.

The filter insert (97) is designed such that it can receive beverage base substance (7) in bulk or a pad (12). For the use of a pad (12) the ring (29) and the side wall (114) of the filter inserts (97) are formed such that enough space is provided for the paper edges extending with pads (12).

The filter unit (103) can be inserted and taken out as a whole. The connection of filter inserts (97) and filter lock (98) is provided for example by burls or protruding noses (119) at the outer side of the annular flange (29) at filter lock (98). These clamp the filter insert (97) to filter lock (98) releasable to each other at their assembly.

The filter insert (97) comprises a flange (99) by which it lies on the edge of the brewing container (96). This flange (99) contains sealing connections (105) between brewing container (96) and filter insert (97) and (106) between filter insert (97) and filter lock (98). These sealings (105, 106) can be separate or injection moulded O-rings, but they are preferably part of the flange (99). The filter insert (97) is then entirely formed from an elastic material.

The brewing chamber (65) is provided in this example with a taper (102) which corresponds to the profile (87) in FIG. 8, but it is here part of the supporting rings (116, 117) of filter insert (97) and filter lock (98). This makes clear that the profiles shown in FIGS. 7 and 8 of the brewing chamber taper (102) are not necessarily formed by metal parts, but can be implemented as parts of the supporting rings. The filter devices and shieldings—(111, 112) of filter insert (97) in filter lock (98) are consequently simple-shaped and cost effectively manufacturable.

The trip stone (101) is formed simple and material efficient by the tapering (102) of the brewing chamber (65).

Figure 11:
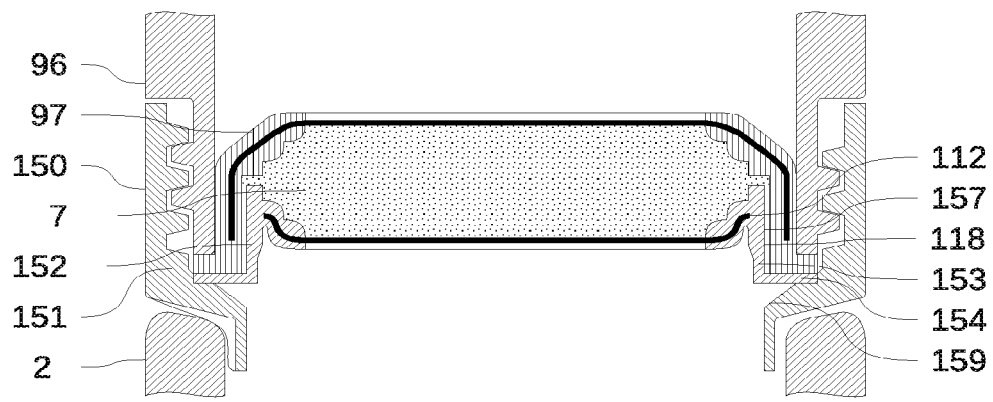

A third example of the filter lock (150) is shown in FIG. 11. It consists of a supporting ring (151) of a rigid stable material in which the insert (152) is permanently inserted. The insert (152) consists of a cylinder (157) which is closed on one side with the filter (112) and provides on the other side toward the outeside a flange (154). The flange (154) is permanently connected to the supporting ring (151). The insert (152) is entirely made from an elastic material.

The cylinder (157) is provided with a deformation area (153) shortly above the flange (154). The cylinder (118) has here a thinner wall thickness wherein the tension onto the flange remains in an acceptable range due to the yielding of the deformation area (153).

Figure 12:
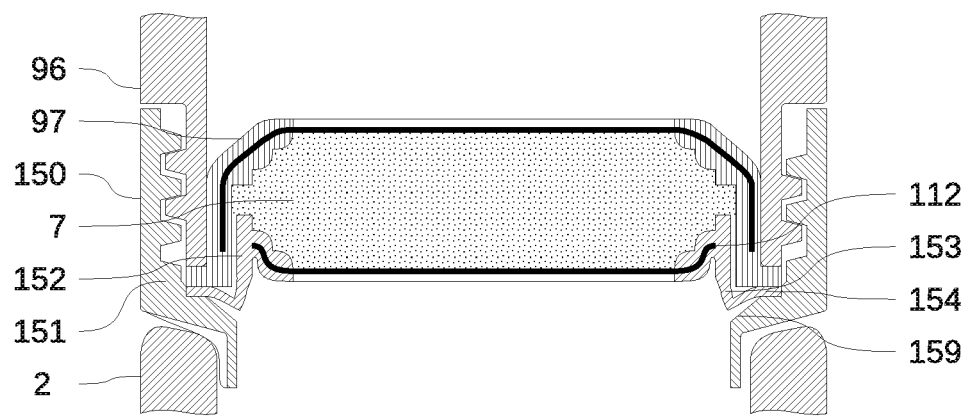

FIG. 12 shows the filter lock (150) with the brewing chamber heavily filled with beverage base substance (7). The deformation area (153) and flange (154) deform in such a case such that the filter (112) can be moved downwards in lock (150) and the brewing chamber becomes larger. In order to avoid an excessive deformation of the insert (152), stop (159) in the supporting ring (151) is the end of the movement.

In case the brewing pressures are that high during the brewing process that the filter is moved unwanted due to the described spring mechanism, the spring mechanism can be received in the filter insert (97) for widening the brewing chamber (65).

Figure 13:
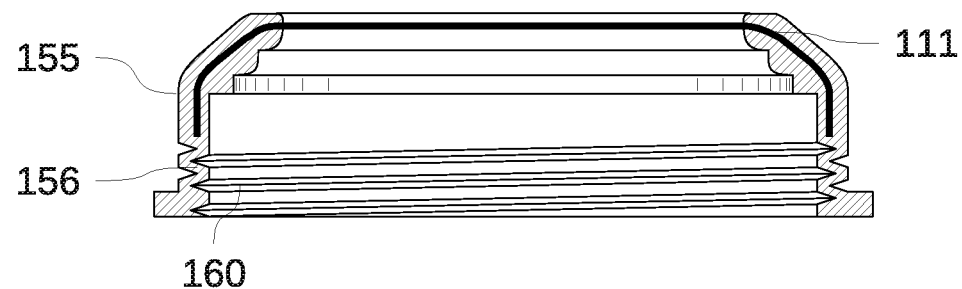

FIG. 13 shows an example how the filter insert (97) with spring mechanism can be formed cost efficiently. The filter insert (155) made from an elastic material has stretching ribs (156) that are implemented like a thread. Hereby the undercuts (160) at the inner side can be deformed during the despindling of the mould. The corresponding notches at the outside are uncritical in manufacturing.

If the filter insert (155) is heavily filled, the undercuts (160) are stretched during closing of the beverage maker (1) and provide more space for the beverage base substance (7).

Figure 14:
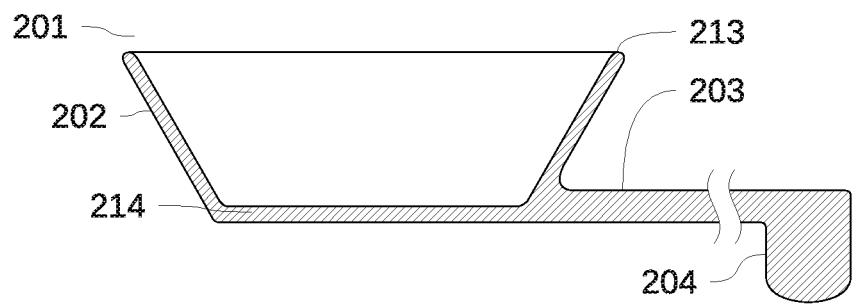
Figure 15:
Figure 16:
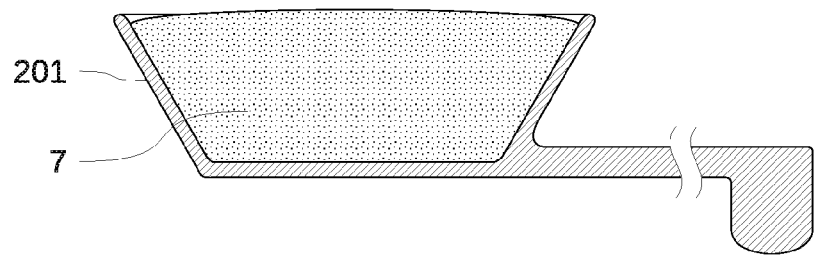
Figure 17:
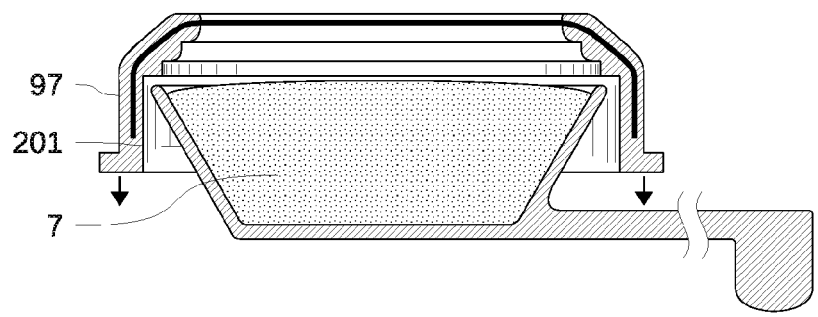
Figure 18:
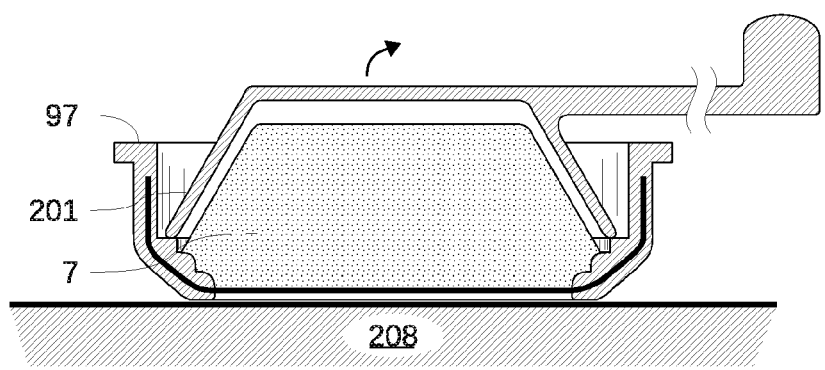
Figure 19:
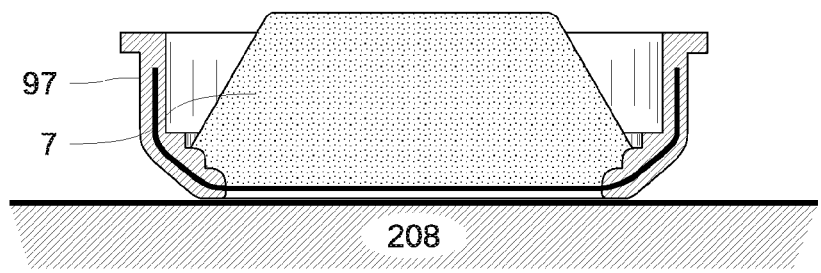
Figure 20:
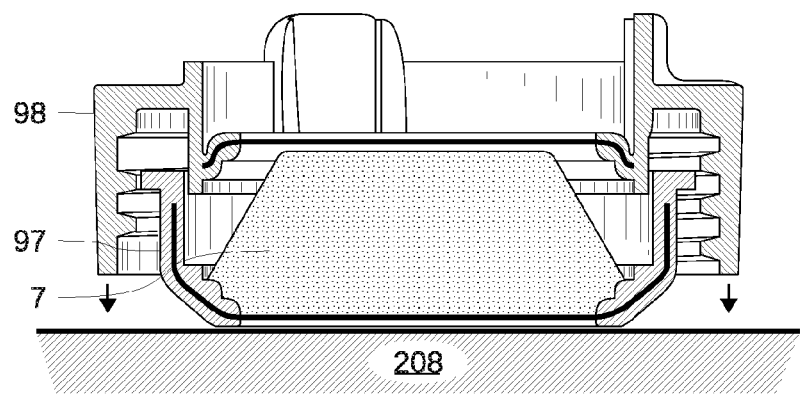
Figure 21:
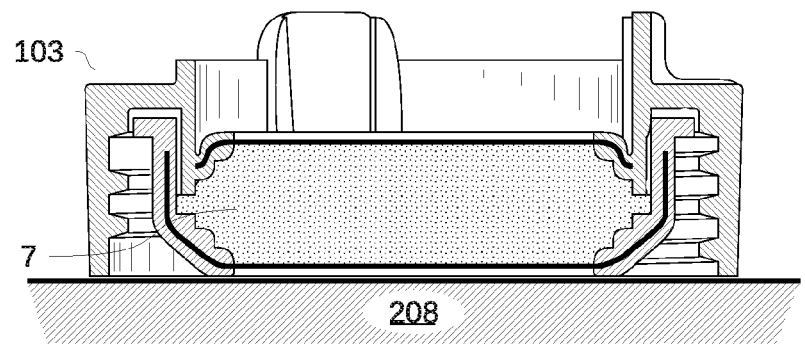
Figure 22:
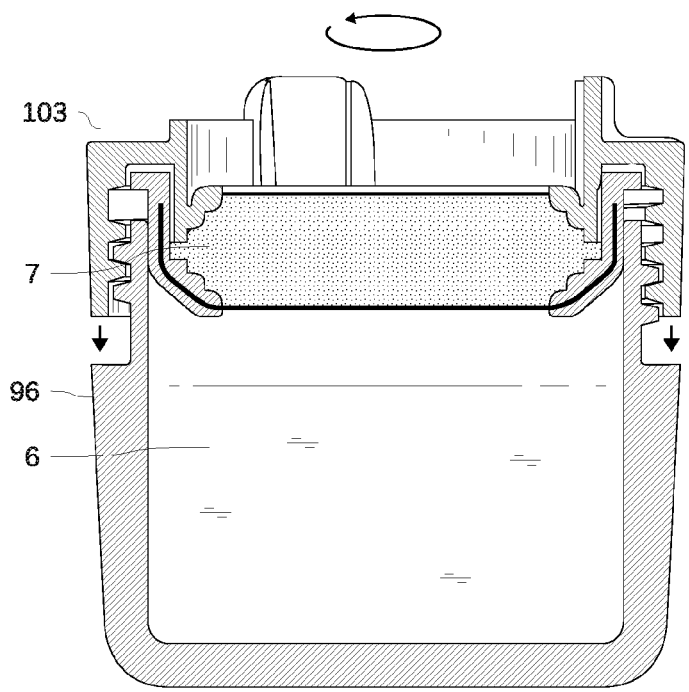
Figure 23:
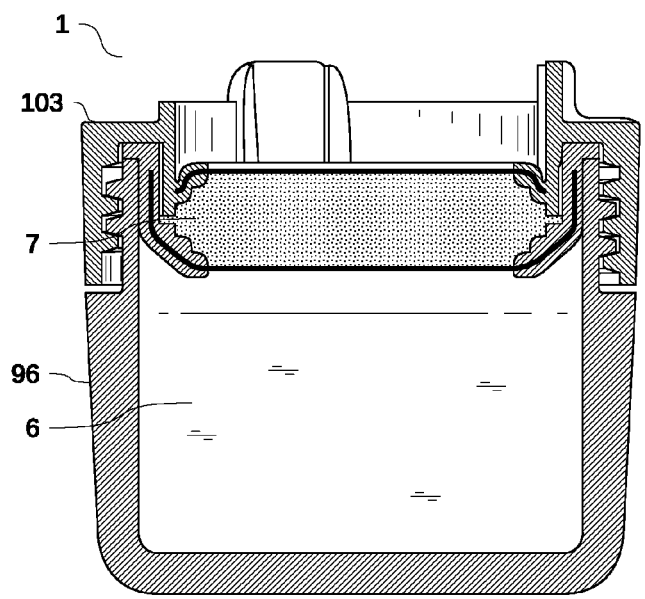
Figure 24:
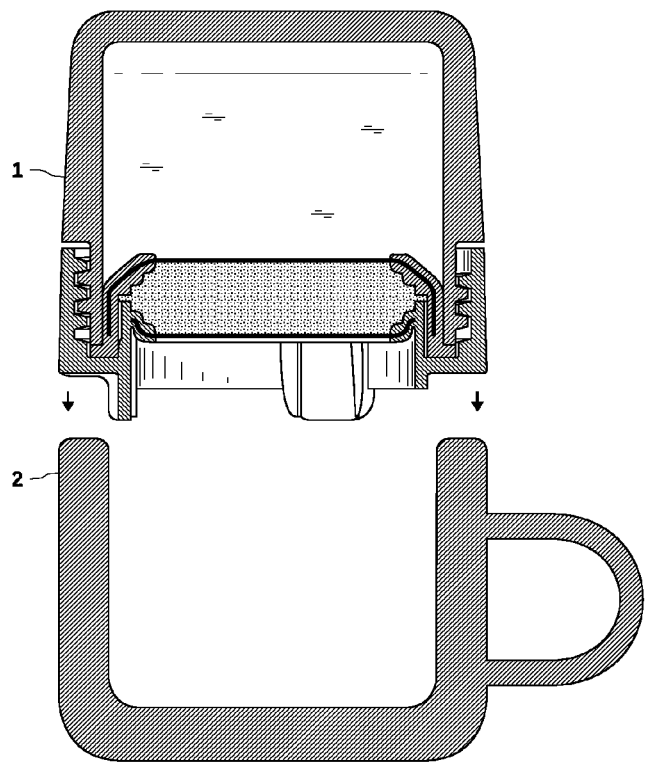

The device for filling the brewing chambers (65) is shown in FIGS. 14 and 15. It is shortly termed apportioning device (201).

The apportioning device (201) comprises of a cavity (202), at the bottom (214) of which a handle (203) is fixed. The rim of the cavity (202) is at least at its edge (213) adapted exactly to the form of the filter insert (97) or of the corresponding vessel to be filled. The rim is tapered in the direction to the bottom (214) of the cavity (202). With a round vessel to be filled, this is thus a cavity for example in form of a truncated cone.

At the end of the arm (203) there is a handle (204) which is oriented opposite to the opening of the cavity (202). This makes the handle (204) easily tangible during the method. The arm (203) is provided with a stabilising bar (305) along its length.

Instead of arranging the handle (204) at the arm (203) it can also be arranged directly at the bottom (214) of the cavity (202). It is also possible to omit the arm (203).

FIGS. 16 to 24 show the individual steps of the invention.
(a) Filling of the apportioning device (201) (FIG. 16)
  A determined volume of beverage base substance (7) is bailed from a stock container by the apportioning device (201).
(b) Imposing the filter insert (97) on to the filled apportioning device (201)(FIG. 17)
  The filter insert (97) is imposed on the apportioning device (201) with the opening facing downwards. In another embodiment of the beverage maker another corresponding part or the entire maker is filled with the beverage base substance (7) instead of the filter insert (97) and thus this is imposed on the apportioning device (201).
(c) The filter insert (97) and the dosing device (201) are flipped over together
  The chamber delimited by the apportioning device (201) and the filter insert (97) can be flipped over safely without spilling the beverage base substance (7).
(d) Depositing the filter insert (97) on a flat depot (208)(FIG. 18)
  The depositing on a flat depot (208) serves for avoiding a spilling of the beverage base substance (7) in the subsequent exchange of the apportioning device (201) with the filter lock (98).
(e) Removing the apportioning device (201) (FIG. 19)
  During removal of the apportioning device (201) the beverage base substance (7) largely maintains the form of the dosing device (201). Due to the forming, the beverage base substance (7) can achieve steeper sides as if loosely filled up. Due to the support on the flat depot (208) a destruction of the sides is avoided.
(f) Imposing the filter lock (98) on the filled filter insert (97) (FIG. 20)
  The filter lock (98) is imposed on the filter insert (97). The ring (29) of the filter lock (98) engages first in the edge of the filter insert (97) in order to avoid that beverage base substance (7), which is pressed towards the sides by the closing, spills out of the brewing chamber (29).
(g) Pressing the filter lock (98) such that a connected filter unit (103) is formed (FIG. 21)
  During pressing the filter lock (98) a support device engages that connects the filter insert (97) and filter lock (98). By this connection, an unintended release is avoided and the connection of filter insert (97), filter lock (98) and the beverage base substance (7) contained therein, together the filter unit (103), can be handled as a whole.
(h) Placing the filter unit (103) on the filled brewing container (96) (FIG. 22)
(i) Fastening such that the brewing unit (1) is ready for operation (FIG. 23)
  The filter unit (103) is fastened by turning whereby on one side the beverage base substance (7) is compressed or tampered adequately and on the other side, the sealing of the beverage maker is fastened such that the brewing container (96) is closed pressure tightly with the filter unit (103). The brewing unit (1) is now completely prepared for the brewing process.
(j) Flipping the brewing unit (1)
  With the shown beverage maker, the brewing unit (1) is mounted upside down and hast to be flipped over for use.
(k) Placing the brewing unit (1) on the reception container (2) (FIG. 24)
  The brewing unit (1) is finally correctly connected with the reception container (2) if this was not yet mounted in a preceding step together with another device.

After finalizing the filling method, one can proceed with the preparation relating to the beverage maker.

Figure 25:
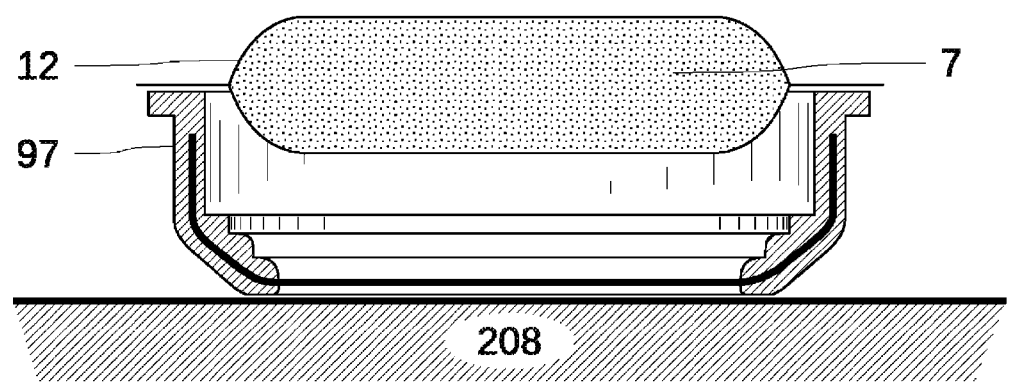

In case a pad or a cartridge is used this method is adapted. The steps (a) to (e) are then replaced by the following steps:
(l) Depositing the filter insert (97) on a depot.
  The filter insert (97) is placed empty and with the opening on top on a depot (208).
(m) Placing the pad (FIG. 25)
  The pad (12) or the cartridge is loosely placed on the filter insert (97).

Figure 26:
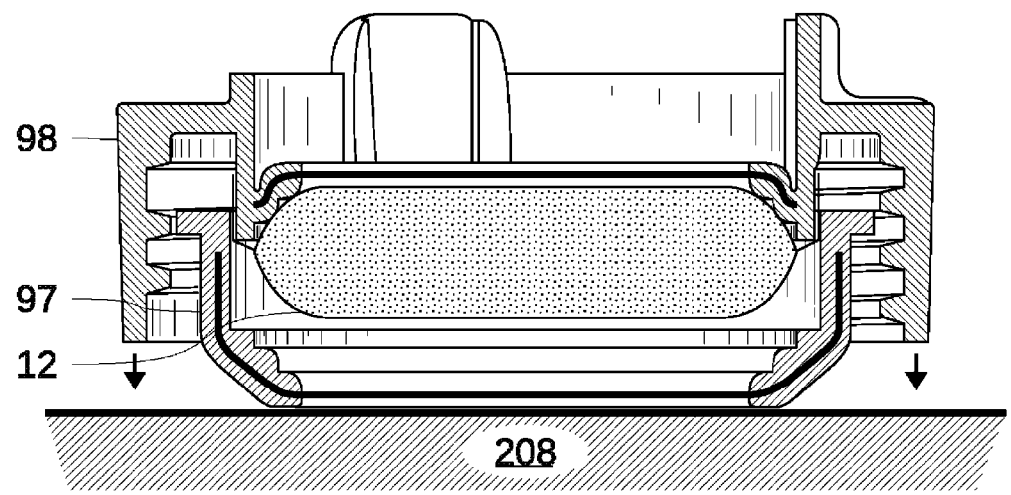

After step (m) one continues with step (f) wherein depending on the type of the pad, cartridge or beverage maker that is used, changes in the inner processes are required such as for example broaching of the cartridge. The method for the user, however, remains the same.
(g) Imposing the filter lock (98) on the filled filter insert (97) (FIG. 26)
  The imposing of the filter lock centres or positions the pad (12) or the cartridge adapted to the further process. This step ensures also the correct orientation of, for example the extending edge of the paper filter as it is usually the case with pads (12). In this case this is folded between the filter insert (97) and the ring (29) of the filter lock (98). This is also the earliest point in time at which opening devices arranged in the lock (98) or in the filter insert (97) open the cartridge or the pad (12) or start to open it.
(j) Fastening such that the brewing unit (1) forms.
  Now the pad (12) or the cartridge is entirely opened at the latest. Also the used pad (12) is pressed and/or tampered into the form required for brewing.

The invention claimed is:

1. An apparatus for preparing beverages, comprising:
 a brewing container and a filter unit for filling with the beverage base substance, wherein the filter unit consists of a filter insert and a filter lock, wherein the filter insert is inserted into the filter lock and the filter unit is attached to the brewing container by engaging the filter lock with the brewing container forming an engaging portion of the filter lock with the brewing container
 characterized in that the filter insert contains a first sealing part forming a first sealing area between the filter insert and the brewing container as well as a second sealing part forming a second sealing area between the filter insert and the filter lock, wherein each sealing area is formed by its own compression arrangement, wherein the first sealing part and the second sealing part are integrally formed with the filter insert, and wherein the first sealing part and the second sealing part are perpendicularly spaced apart from each other such that the first sealing part is on an upper end of the engaging portion and the second sealing part is on a lower end of the engaging portion; and wherein the apparatus brews a beverage from a beverage base substance and a brewing liquid by means of electromagnetic radiation.

2. The apparatus of claim 1, wherein the first sealing area is formed as O-rings moulded onto the filter insert.

3. The apparatus of claim 1, wherein the filter insert comprises a filter and a supporting ring made from an elastic material.

4. The apparatus of claim 1, wherein the filter insert is entirely made from an elastic material.

5. The apparatus of claim 3, wherein the filter insert comprises a flange, which is arranged between the brewing container and the filter lock and contains a first sealing portion between the filter insert and the brewing container as well as a second sealing portion between the filter insert and the filter lock.

6. The apparatus of claim 1, wherein the filter insert comprises a spring mechanism widening the brewing chamber formed by the filter insert and the filter lock.

7. The apparatus of claim 6, wherein the filter insert comprises stretching ribs.

8. The apparatus of claim 1, wherein the filter lock comprises noses which, when filter insert and filter lock are connected, press against the filter insert such that the filter lock and the filter insert releasably clamp together.

9. The apparatus of claim 1, wherein the filter insert comprises burls which, when filter insert and filter lock are connected, press against the filter lock such that the filter insert and the filter lock releasably clamp together.

* * * * *